United States Patent
Saito

(10) Patent No.: US 10,912,410 B2
(45) Date of Patent: Feb. 9, 2021

(54) OVENWARE AND LIQUID CRYSTALLINE POLYESTER RESIN COMPOSITION FOR MOLDING OVENWARE

(71) Applicant: Sumitomo Chemical Company, Limited, Tokyo (JP)

(72) Inventor: Shintaro Saito, Tsukuba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 21 days.

(21) Appl. No.: 16/322,223

(22) PCT Filed: Aug. 2, 2017

(86) PCT No.: PCT/JP2017/028034
§ 371 (c)(1),
(2) Date: Jan. 31, 2019

(87) PCT Pub. No.: WO2018/025913
PCT Pub. Date: Feb. 8, 2018

(65) Prior Publication Data
US 2019/0191923 A1   Jun. 27, 2019

(30) Foreign Application Priority Data
Aug. 4, 2016 (JP) ................. 2016-153717

(51) Int. Cl.
*A47J 36/04* (2006.01)
*C08K 5/098* (2006.01)
*F24C 15/16* (2006.01)
*B65D 1/26* (2006.01)
*A47J 27/00* (2006.01)
*C08L 67/00* (2006.01)
*C08K 3/00* (2018.01)
*C08K 5/09* (2006.01)
*C08K 3/013* (2018.01)
*C08G 63/60* (2006.01)
*C08G 63/685* (2006.01)
*C08G 63/692* (2006.01)
*C08K 3/34* (2006.01)

(52) U.S. Cl.
CPC ............. *A47J 36/04* (2013.01); *A47J 27/00* (2013.01); *B65D 1/26* (2013.01); *C08G 63/605* (2013.01); *C08G 63/6854* (2013.01); *C08G 63/6924* (2013.01); *C08K 3/00* (2013.01); *C08K 3/013* (2018.01); *C08K 3/34* (2013.01); *C08K 5/09* (2013.01); *C08K 5/098* (2013.01); *C08L 67/00* (2013.01); *F24C 15/16* (2013.01); *C08K 2201/005* (2013.01)

(58) Field of Classification Search
USPC ........................................... 521/170
See application file for complete search history.

(56) References Cited

U.S. PATENT DOCUMENTS

| | | | |
|---|---|---|---|
| 5,141,985 A | 8/1992 | Asai et al. | |
| 5,308,913 A | 5/1994 | Asai et al. | |
| 2003/0047712 A1 | 3/2003 | Maeda et al. | |
| 2007/0172754 A1 | 7/2007 | Koga et al. | |
| 2010/0051999 A1 | 3/2010 | Iwase et al. | |
| 2014/0099459 A1 | 4/2014 | Tyler et al. | |
| 2015/0353827 A1 | 12/2015 | Hegi | |
| 2017/0260346 A1 | 9/2017 | Hirata et al. | |
| 2018/0084942 A1 | 3/2018 | Saito et al. | |

FOREIGN PATENT DOCUMENTS

| | | |
|---|---|---|
| EP | 2206744 A1 | 7/2010 |
| JP | H03-265650 A | 11/1991 |
| JP | H04-248868 A | 9/1992 |
| JP | 2003-012908 A | 1/2003 |
| JP | 2007-199139 A | 8/2007 |
| JP | 4570723 B2 | 10/2010 |
| JP | 2012136625 A | 7/2012 |
| JP | 2013199598 A | 10/2013 |
| JP | 2016-014137 A | 1/2016 |
| TW | 201612220 A | 4/2016 |
| WO | 2014/055251 A1 | 4/2014 |
| WO | 2016/153048 A1 | 9/2016 |

OTHER PUBLICATIONS

Int'l Search Report dated Sep. 5, 2017 in Int'l Application No. PCT/JP2017/028034.
Extended European Search Report dated Feb. 11, 2020 in EP Application No. 17837015.1.
Office Action dated Jul. 21, 2020 in JP Application No. 2016153717 (with English Machine Translation).
Office Action dated Nov. 24, 2020 in TW Application No. 106126201 (English Machine Translation).

*Primary Examiner* — Terressa Boykin
(74) *Attorney, Agent, or Firm* — Panitch Schwarze Belisario & Nadel LLP

(57) ABSTRACT

An ovenware is a molded article of a resin composition containing a liquid crystalline polyester resin, an inorganic filler, and a fatty acid compound, in which, when the ovenware is heated at 250° C., a total generated concentration of notional and decanal derived from the fatty acid compound is 1 vol ppb or less.

17 Claims, 2 Drawing Sheets

OVENWARE AND LIQUID CRYSTALLINE POLYESTER RESIN COMPOSITION FOR MOLDING OVENWARE

CROSS-REFERENCE TO RELATED APPLICATIONS

This application is a Section 371 of International Application No. PCT/JP2017/028034, filed Aug. 2, 2017, which was published in the Japanese language on Feb. 8, 2018 under International Publication No. WO 2018/025913 A1, which claims priority under 35 U.S.C. § 119(b) to Japanese Application No. 2016-153717, filed on Aug. 4, 2016, the disclosures of which are incorporated herein by reference in their entireties.

TECHNICAL FIELD

The present invention relates to an ovenware and a liquid crystalline polyester resin composition for molding an ovenware.

BACKGROUND ART

An ovenware, which are cooking and heating containers for oven ranges using an oven heating method, is demanded to have various characteristics such as excellent heat resistance, mechanical strength, and a good appearance.

As materials having excellent heat resistance, polyester resins are given. Among these, a wholly aromatic polyester resin (may be referred to below as "liquid crystalline polyester" or "liquid crystalline polyester resin") has various excellent properties based on the structure thereof, particularly in respect of heat resistance, and is thus adopted as a material of ovenware exposed to high temperatures. For example, PTLs 1 and 2 disclose ovenware made of wholly aromatic polyester resins.

CITATION LIST

Patent Literature

[PTL 1] Japanese Unexamined Patent Application, First Publication No. H4-248868
[PTL 2] Japanese Unexamined Patent Application, First Publication No. H3-265650

SUMMARY OF INVENTION

Technical Problem

Ovenware is used at high temperatures and comes in contact with food. In a case where odorous components are generated from the materials forming the ovenware, there is a possibility that the flavor of the food may be impaired. Therefore, it is necessary to suppress the odor.

The present invention was made in view of the above circumstances, and an object thereof is to provide an ovenware which generates few odorous components, and a liquid crystalline polyester resin composition which is able to be suitably used for the ovenware.

Solution to Problem

The present invention provides the following.
[1] An ovenware which is a molded article of a resin composition containing a liquid crystalline polyester resin, an inorganic filler, and a fatty acid compound, in which, when the ovenware is heated at 250° C., a total generated concentration of nonanal and decanal derived from the fatty acid compound is 1 vol ppb or less.
[2] The ovenware according to [1], in which an amount of the fatty acid compound is 0.001 arts by mass or more and 0.5 parts by mass or less with respect 100 parts by mass of the liquid crystalline polyester resin.
[3] The ovenware according to [1] or [2], in which the fatty acid compound has 12 to 24 carbon atoms.
[4] The ovenware according to any one of [1] to [3], in which the fatty acid compound is a fatty acid metal salt.
[5] The ovenware according to [4], in which a metal of the fatty acid metal salt is at least one type selected from the group consisting of lithium, magnesium, calcium, zinc, sodium, and potassium.
[6] The ovenware according to any one of [1] to [5], in which an amount of the inorganic filler is 50 parts by mass or more and 100 parts by mass or less with respect to 100 parts by mass of the liquid crystalline polyester resin.
[7] The ovenware according to any one of [1] to [6], in which the liquid crystalline polyester resin has a repeating unit represented by Formula (1).

$$—O—Ar^1—CO— \quad (1)$$

[in Formula (1), $Ar^1$ represents a phenylene group, a naphthylene group, or a biphenylylene group, and at least one hydrogen atom in the group represented by $Ar^1$ may be substituted with a halogen atom, an alkyl group having 1 to 10 carbon atoms, or an aryl group having 6 to 20 carbon atoms.]

[8] The ovenware according to any one of [1] to [7], in which the liquid crystalline polyester resin has a repeating grim represented by Formula (2).

$$—CO—Ar^2—CO— \quad (2)$$

[in Formula (2), $Ar^2$ represents a phenylene group, a naphthylene group, a biphenylylene group, or a group represented by Formula (4); and at least one hydrogen atom included in $Ar^2$ may be substituted with a halogen atom, an alkyl group having 1 to 10 carbon atoms, or an aryl group having 6 to 20 carbon atoms.]

$$—Ar^4—Z—Ar^5— \quad (4)$$

[in Formula (4), $Ar^4$ and $Ar^5$ each independently represent a phenylene group or naphthylene group; and Z represents an oxygen atom, a sulfur atom, a carbonyl group, sulfonyl group, or an alkylidene group having 1 to 10 carbon atoms.]

[9] The ovenware according to any one of [1] to [8], in which the liquid crystalline polyester resin has a repeating unit represented by Formula (3).

$$—X—Ar^3—Y— \quad (3)$$

[in Formula (3), $Ar^3$ represents a phenylene group, a naphthylene group, a biphenylylene group, or a group represented by Formula (4); X and Y each independently represent an oxygen atom or an imino group (—NH—); and at least one hydrogen atom included in $Ar^3$ may be substituted with a halogen atom, an alkyl group having 1 to 10 carbon atoms, or an aryl group having 6 to 20 carbon atoms.]

$$—Ar^4—Z—Ar^5— \quad (4)$$

[in Formula (4), $Ar^4$ and $Ar^5$ each independently represent a phenylene group or a naphthylene group; and Z represents an oxygen atom, a sulfur atom, a carbonyl group, a sulfonyl group, or an alkylidene group having 1 to 10 carbon atoms.]

[10] A liquid crystalline polyester resin composition for molding an ovenware which is a resin composition containing a liquid crystalline polyester resin, an inorganic filler, and a fatty acid compound, in which, when the ovenware is heated at 250° C., a total generated concentration of nonanal and decanal is 1 vol ppb or less.

Advantageous Effects of Invention

According to the present invention, it is possible to provide an ovenware which generates few odorous components and a liquid crystalline polyester resin composition which is able to be suitably used for the ovenware.

DESCRIPTION OF EMBODIMENTS

Ovenware

Figure 1:
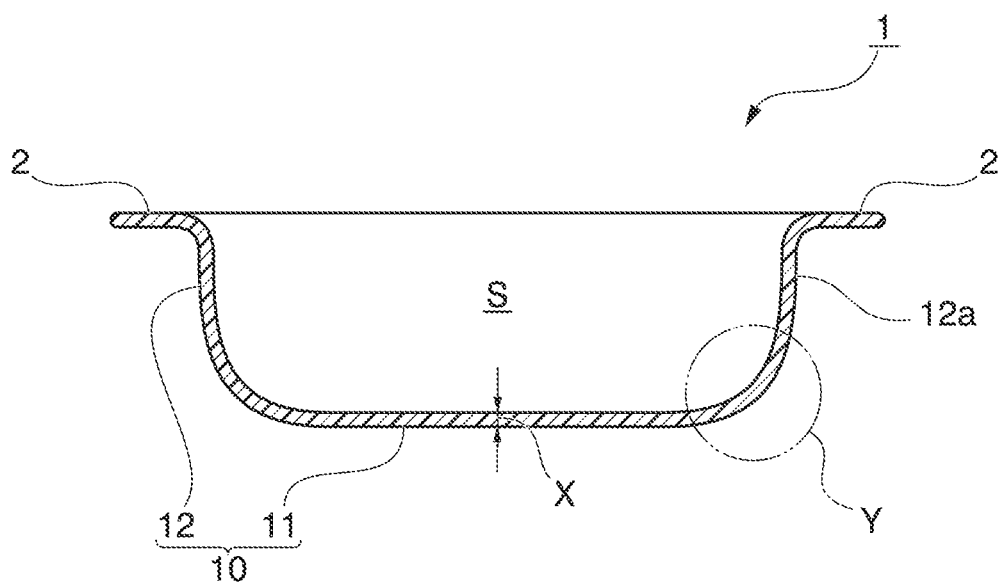
FIG. 1 is a schematic cross-sectional view of an example of an ovenware in an aspect of the present invention.

The present invention is an ovenware using a resin composition containing a liquid crystalline polyester resin, an inorganic filler, and a fatty acid compound, in which, when the ovenware is heated at 250° C., a total generated concentration of nominal and decanal derived from the fatty acid compound is 1 vol ppb or less.

Nonanal and decanal are known as components having an unpleasant odor and as substances which are detected by humans as unpleasant odors even in small amounts. It is presumed that these compounds are generated by oxidative decomposition or the like caused by heating fatty acids and the like. When heating and cooking using an ovenware, these unpleasant odorous components impair the flavor of the food, thus, the amount of unpleasantly odorous components generated during heating and cooking is preferably small.

In the ovenware according to an aspect of the present invention, in a case of being heated at 250° C., the total generated concentration of nonanal and decanal is 1 vol ppb or less. Therefore, even in a case where heating and cooking is carried out, the generation of unpleasant odorous components is small, and it is possible to obtain an ovenware with little odor. In the ovenware according to an aspect of the present invention, the total generated concentration of nonanal and decanal in a case of being heated at 250° C. is preferably 0.8 vol ppb or less, and more preferably 0.5 vol ppb or less.

Nonanal and decanal are volatile components. Therefore, as a method for setting the total generated concentration of nonanal and decanal to 1 vol ppb or less in a case of being heated at 250° C., for example, there is a method in which an injection molded ovenware is heated once at a high temperature of approximately 250° C. to remove volatile components. Using this method makes it possible to reduce the amount of substances with an unpleasant odor generated during heating and cooking.

In the present invention, the total generated concentration of nonanal and decanal is a value measured by the following method.

A test piece to be used for measurement is a test piece formed using the resin composition to be used in the ovenware of the present invention to be approximately 5 cm square and 1 to 2 mm thick. This 70 g test piece was placed in a glass chamber and the temperature of the glass chamber was raised from room temperature to 250° C. in a heating oven for approximately 15 minutes while passing high-purity nitrogen gas into the glass chamber and then heating was continued at 250° C. for approximately 45 minutes (a total of 60 minutes). 10 liters of high-purity nitrogen gas pass into the glass chamber for 60 minutes from the start to the end of heating and all 10 liters are collected together with the gas components generated from the test piece. Here, the temperature is raised to 250° C. means a point in time when the temperature in the heating oven reaches 250° C., and does not necessarily mean a case where the sample reaches 250° C.

Using cold trap dehydration gas chromatograph mass spectrometry (CTD-GC-MS method), the sample gas collected in this manner was measured for the concentration of nonanal and decanal present in the collected 10 liters of high-purity nitrogen gas. The concentrations of normal and decanal are in terms of toluene and are calculated from the ratio of the peak area of toluene and the peak area of each component, assuming that the relationships between the intensity bated the concentration of the signals of the detected components are all equal to toluene.

FIG. 1 shows a schematic cross-sectional view of an ovenware 1 in an aspect of the present invention. As shown in FIG. 1, the ovenware 1 according to an aspect of the present invention has a handle portion 2 and at container portion 10.

The container portion 10 has a space S to accommodate foodstuffs and the like to be cooked during use. The container portion 10 has as bottom portion 11 and a side wall 12 provided in a closed ring shape in a plan view in a peripheral portion of the bottom portion 11. The space S is a space surrounded by the bottom portion 11 and the side wall 12. The container portion 10 is preferably a wide-mouthed container which is entirely open upward the vertical direction from the horizontal surface of the bottom portion 11. "Horizontal surface of the bottom portion" means the surface which is substantially horizontal in the inner surface (that is, the interface with the space S) of the bottom portion when the ovenware formed of the container portion and the handle portion according to an aspect of the present invention is placed on a horizontal surface. "Substantially horizontal" means that the surface may have a gradient of −40% to +40% with respect to the horizontal surface.

An ovenware according to an aspect of the present invention has an internal volume of 500 mL or more and 6 L or less. In an aspect of the present invention, the "internal volume of the ovenware" mans the maximum amount of water which is able to be placed in the ovenware under a condition of a temperature of 25° C.

In an aspect of the present invention, the internal volume of the ovenware is preferably 1 L or more and 6 L or less, and more preferably 2 L or more and 6 L or less.

In the ovenware 1 according to an aspect of the present invention, the "internal volume" means the maximum amount of water which is able to be placed in the space S under the condition of a temperature of 25° C.

The handle portion 2 may be provided in a part of the container portion 10 or may be provided in a peripheral portion.

The handle portion 2 is a structure portion for the user to hold mainly when carrying the ovenware 1. The handle portion 2 is provided on an outer wall 12a of a side wall 12 so as to protrude from the outer wall 12a in a plan view to the opposite side to the space S side. The handle portion 2 may be provided on the upper end portion of the side wall 12 (that is, the opposite side to the bottom portion 11), or may be provided in the central potion between the upper end portion of the side wall 12 and the bottom portion 11.

Figure 2:
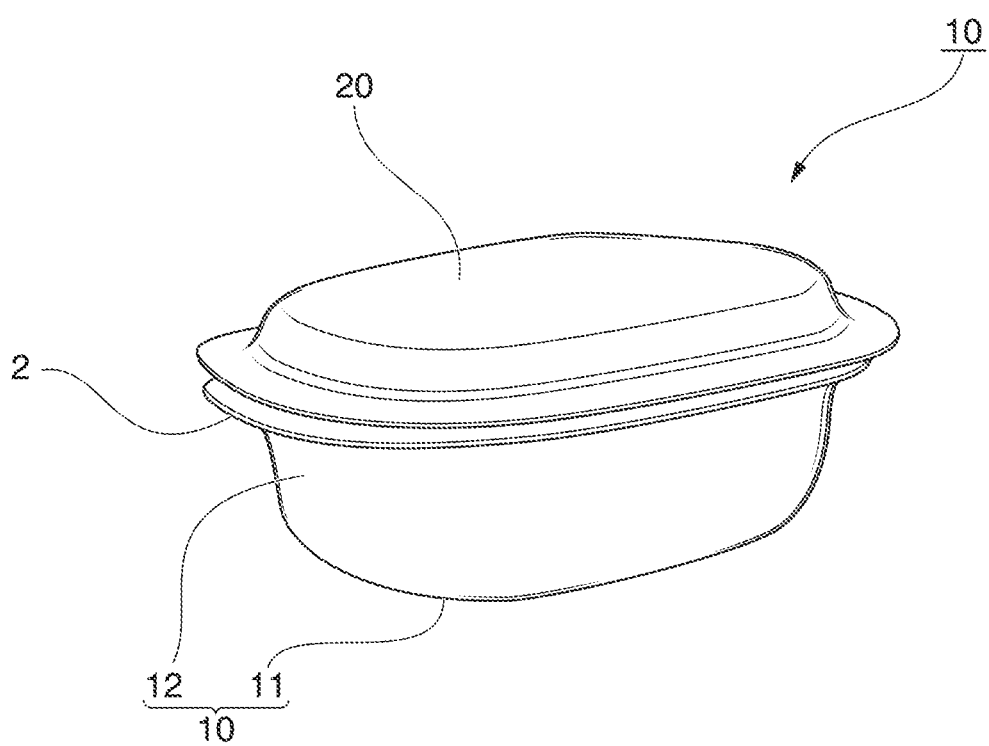
FIG. 2 is a perspective view representing an overall shape of an example of an ovenware in an aspect a the present invention.

In addition, as shown in FIG. 2, the ovenware of the present invention may also have a detachable lid portion 20. The shape of the lid portion 20 is snot particularly limited, but the lid portion 20 preferably has a shape which is able to be placed on and removed from the upper portion of the handle portion 2.

In an aspect of the present invention, the height of the ovenware formed of the container portion and the handle portion is preferably 1 cm or more and 30 cm or less, and more preferably 3 cm or more and 20 cm or less.

In an aspect of the present invention, the lateral width of the ovenware formed of the container portion and the handle portion is preferably 5 cm or more and 50 cm car less, and more preferably 10 cm or more and 40 cm or less.

In an aspect of the present invention, the depth of the ovenware formed of the container portion and the handle portion is preferably 5 cm or more and 50 cm or less, and more preferably 10 cm or more and 40 cm or less.

In a case where the ovenware of the present invention also has the lid portion 20, the height, the lateral width, and the depth are preferably in the above ranges when the lid portion 20 is placed on the container portion 10.

Here, "the height of the ovenware formed of the container portion and the handle portion" means the shortest distance to the top portion of the ovenware formed of the container portion and the handle portion from the upper surface of the horizontal surface when the ovenware formed of the container portion and the handle portion in the present invention is placed on a horizontal surface.

"The lateral width of the oven are formed f the container portion and the handle portion" means the maximum length of the ovenware in the horizontal direction when the ovenware formed of the container portion and the handle portion in the present invention is placed on a horizontal surface.

"The depth of the ovenware formed of the container portion and the handle portion" means the maximum length in the horizontal direction orthogonal to the direction of the lateral width when the ovenware formed of the container portion and the handle portion in the present invention is placed oar a horizontal surface.

In an aspect of the present invention, the thickness of the container portion of the ovenware 1 is 0.3 mm or more and 5 mm or less, and more preferably 1 mm or more and 4 mm or less. The thickness of the container portion of the ovenware 1 is the thickness indicated by X in FIG. 1 and means the thinnest thickness at the measurement point.

As another aspect, "the thickness of the container portion of the ovenware" means the shortest distance from the surface (that is, the inner wall of the ovenware) in contact with the space containing the foodstuff or the like at an arbitrary position of the container portion of the ovenware to the surface (that is, the outer wall of the ovenware) of the opposite side to the surface in contact with the space.

It is possible to measure the thickness of the container portion of the ovenware using, for example, a micrometer.

The shape of the ovenware 1 according to an aspect of the present invention is not particularly limited and it is possible to appropriately select a rectangular parallelepiped, a cube, an oval shape, a shape with a curved boundary between a bottom portion and a side wall as shown in a region Y surrounded by a two-dot chain line in FIG. 1, or the like.

Among these, since the oval shape and the shape with a curved boundary between a bottom portion and a side wall as shown in a region Y surrounded by a two-dot chain line in FIG. 1, and the like are preferable since the inner wall of the ovenware 1 is easily cleaned, here are no corners at the outer wall of the ovenware, it is possible to favorably preserve the strength thereof.

When the ovenware 1 containing foodstuffs or the like to be cooked in the container portion 10 at the time of use is taken out from the oven, there is a concern that the handle portion 2 may become deformed due to the weight of the foodstuff or the like. Therefore, from the viewpoint of improving the strength, the thickness of the handle portion 2 of the ovenware 1 may be thicker than the thickness of the container portion 10. It is possible to measure the thickness of the handle portion of the ovenware using, for example, a micrometer.

A description will be given below of the resin composition to be used in the ovenware of the present embodiment.

Resin Composition

The resin composition used in the present embodiment contains liquid crystalline polyester resin, an inorganic filler, and a fatty acid compound.

Liquid Crystalline Polyester Resin

The liquid crystalline polyester resin (may be referred to below as "liquid crystalline polyester") used the ovenware of the present invention is a resin having a repeating unit derived from an aromatic hydroxycarboxylic acid as a mesogenic group. Here, "hydroxycarboxylic acid" means a compound having both a hydroxy group (—OH) and a carboxy group (—C(=O)—OH) in one molecule.

The liquid crystalline polyester is a liquid crystalline polyester exhibiting liquid crystalline property in a molten state, and is preferably melted at a temperature of 250° C. or higher and 450° C. or lower. The liquid crystalline polyester is preferably a wholly aromatic liquid crystalline polyester obtained using only an aromatic compound as a raw material monomer.

Examples of the liquid crystalline polyester include a liquid crystalline polyester in which an aromatic hydroxycarboxylic acid, an aromatic dicarboxylic acid, and at least one compound selected front the group consisting of an aromatic diol, an aromatic hydroxyamine, and an aromatic diamine is polymerized (that is, polycondensation), liquid crystalline polyester in which a plurality of types of aromatic hydroxycarboxylic acid are polymerized, and a liquid crystalline polyester in which a polyester such as polyethylene terephthalate and an aromatic hydroxycarboxylic acid are polymerized. Here, the aromatic hydroxycarboxylic acid, the aromatic dicarboxylic acid, the aromatic diol, the aromatic hydroxyamine, and the aromatic diamine may be polymerizable derivatives in place of a part or all thereof, independently of each other.

Examples of polymerizable derivatives of a compound having a ear boxy group such as an aromatic hydroxycarboxylic acid and an aromatic dicarboxylic acid include a derivative (also referred to as an ester) obtained by converting a carboxy group into an alkoxycarbonyl group or an aryloxycarbonyl group, a derivative (also referred to as an acid halide) obtained by converting a carboxy group into a haloformyl group, and a derivative (also referred to as an acid anhydride) obtained by converting a carboxy group into an acyloxycarbonyl group.

Examples of polymerizable derivatives of compounds having hydroxy group such as an aromatic hydroxycarboxylic acid, an aromatic diol, and a aromatic hydroxyamine include derivatives obtained by converting a hydroxy group into acyloxyl group by acylation (also referred to as an ayclated compound).

Examples of the polymerizable derivative of a compound having an amino group such as an aromatic hydroxyamine and an aromatic diamine include a derivative (also referred to as an acylated compound) obtained by converting an amino group into an acylamino group by acylation.

The liquid crystalline polyester preferably has at least one repeating unit represented by Formula (1) (may be referred to below as "repeating unit (1)"). The repeating unit (1) corresponds to the mesogenic group described above.

—O—Ar$^1$—CO— (1)

[Formula (1), Ar$^1$ represents a phenylene group, a naphthylene group, or a biphenylylene group, and at least one hydrogen atom in the group represented by Ar$^1$ may each independently be substituted with a halogen atom, an alkyl group having 1 to 10 carbon atoms, or an aryl group having 6 to 20 carbon atoms.]

Examples of the halogen atom which is able to be substituted with one or more hydrogen atoms in the group represented by Ar$^1$ include a fluorine atom, a chlorine atom, a bromine atom, and an iodine atom.

Examples of the alkyl group having 1 to 10 carbon atoms which is able to be substituted with at least one hydrogen atom in the group represented by Ar$^1$ include a methyl group, an ethyl group, an n-propyl group, an isopropyl group, an n-butyl group, an isobutyl group, a sec-butyl group, a tert-butyl group, an n-hexyl group, an n-heptyl group, a 2-ethylhexyl group, an n-octyl group, a n-nonyl group, an n-decyl group, and the like.

Examples of the aryl group having 6 to 20 carbon atoms which is able to be substituted with at least one hydrogen atom in the group represented by Ar$^1$ include monocyclic aromatic groups such as a phenyl group, an o-tolyl group, an m-tolyl group, and a p-tolyl group; and condensed aromatic groups such as a 1-naphthyl group and a 2-naphthyl group.

In a case here at least one hydrogen atom in the group represented by Ar$^1$ is substituted with any of these groups, the number of substitutions is preferably 1 or 2, and more preferably 1.

The repeating unit (1) is a repeating unit derived from an aromatic hydroxycarboxylic acid.

As the repeating unit (1), a repeating unit in which Ar$^1$ is a 1,4-phenylene group (for example, a repeating unit derived from 4-hydroxybenzoic acid) and a repeating unit in which Ar$^1$ is a 2,6-naphthylene group (for example, a repeating unit derived from 6-hydroxy-2-naphthoic acid) are preferable.

That is, examples of the liquid crystalline polyester preferably include a liquid crystalline polyester having at least one repeating unit of a repeating unit derived from 4-hydroxybenzoic acid (also referred to as parahydroxybenzoic acid) and a repeating unit derived from 6-hydroxy-2-naphthoic acid is preferable, and more preferably a liquid crystalline polyester having a repeating, unit derived from 4-hydroxybenzoic acid.

As another aspect, the liquid crystalline polyester is preferably a liquid crystalline polyester having at least one repeating unit (may be referred to below as "repeating unit (2)") represented by Formula (2). In addition the liquid crystalline polyester is preferably a liquid crystalline polyester having at least one repeating unit (may be referred to below as "repeating unit (3)") represented by Formula (3) below Among the above, a liquid crystalline polyester having a repeating unit (1), a repeating unit (2), and a repeating unit (3) is more preferable. The liquid crystalline polyester may include a plurality of types of each of the repeating unit (2) and the repeating unit (3). The repeating unit (1) preferably has at least one of a repeating unit in which Ar$^1$ is a 1,4-phenylene group and a repeating unit in which Ar$^1$ is a 2,6-naphthylene group.

—CO—Ar$^2$—CO— (2)

[in Formula (2), Ar$^2$ represents a phenylene group, a naphthylene group, a biphenylylene group, or a group represented by Formula (4); at least one hydrogen atom included in Ar$^2$ may be substituted with a halogen at an alkyl group baying 1 to 10 carbon atoms, or an aryl up having 6 to 20 carbon atoms.]

—Ar$^4$—Z—Ar$^5$— (4)

[in Formula (4), Ar$^4$ and Ar$^5$ each independently represent a phenylene group or a naphthylene group; and Z represents an oxygen atom, a sulfur atom, a carbonyl group, a sulfonyl group, or an alkylidene group having 1 to 10 carbon atoms.]

—X—Ar$^3$—Y— (3)

[in Formula (3), Ar$^3$ represents a phenylene group, a naphthylene group, a biphenylylene group, or a group represented by Formula (4); X and Y each independently represent an oxygen atom or an imino group (—NH—); and at least one hydrogen atom included in Ar$^3$ may be substituted with a halogen atom, an alkyl group having 1 to 10 carbon atoms, or an aryl group having 6 to 20 carbon atoms.]

—Ar$^4$—Z—Ar$^5$— (4)

[in Formula (4), Ar$^4$ and Ar$^5$ each independently represent a phenylene group or a naphthylene group, and Z represents an oxygen atom, a sulfur atom, a carbonyl group, a sulfonyl group, or an alkylidene group having 1 to 10 carbon atoms.]

The halogen atom, alkyl group, and aryl group which are able to be substituted with at least one hydrogen atom in the groups represented by or Ar are the same as the halogen atom, alkyl group having 1 to 10 carbon atoms, and aryl group having 6 to 20 carbon atoms, which are able to be substituted with at least one hydrogen atom in the group represented by Ar$^1$.

In a case where at least one hydrogen atom in the group represented by Ar$^2$ or Ar$^3$ is substituted with any of these groups, the number of substitutions is preferably each independently 1 or 2 for each of the groups represented by Ar$^2$ or Ar$^3$, and more preferably 1.

Examples of the alkylidene group having 1 to 10 carbon atoms represented by Z include a methylene group, an ethylidene group, an isopropylidene group, an n-butylidene group, a 2-ethylhexylidene group, and the like.

The repeating unit (2) is a repeating unit derived from an aromatic dicarboxylic acid.

Preferable examples of the repeating unit (2) include a repeating unit in which Ar$^2$ is 1,4-phenylene group (for example, a repeating unit derived from terephthalic acid), a repeating unit in which Ar$^2$ is a 1,3-phenylene group (for example, a repeating unit derived from a isophthalic acid), a repeating unit in which Ar$^2$ is a 2,6-naphthylene group (for example, a repeating unit derived from 2,6-naphthalenedicarboxylic acid), a repeating unit in which Ar$^2$ is a 4,4'-biphenylylene group (for example, a repeating unit derived from 4,4'-dicarboxybiphenyl), or a repeating unit in which Ar$^2$ is a diphenyl ether-4,4'-diyl group (for example, a repeating unit derived from 4,4'-dicarboxydiphenyl ether), and a repeating unit in which Ar$^2$ is a 1,4-phenylene group, a 1,3-phenylene group, a 2,6-naphthylene group, or a 4,4'-biphenylylene group is more preferable.

The repeating unit (3) is a repeating unit derived from at least one type of compound selected from the group consisting of aromatic diols, aromatic hydroxylamines, and aromatic diamines.

Examples of the repeating unit (3) include a repeating wait in which $Ar^3$ is a 1,4-phenylene group (for example, a repeating unit derived from hydroquinone, p-aminophenol, or p-phenylenediamine), a repeating unit in which $Ar^3$ is a 1,3-phenylene group (for example, a repeating unit derived from 1,3-benzenediol, m-aminophenol (for example, 3-acetoxyaminophenol) or m-phenylenediamine), a repeating unit in which $Ar^3$ is a 2,6-naphthylene group (for example, a repeating unit derived from 2,6-dihydroxynaphthalene, a repeating unit derived from 2-hydroxy-6-aminonaphthalene, or a repeating unit derived from 2,6-diaminonaphthalene), a repeating unit in which $Ar^3$ is a 4,4'-biphenylylene group (for example, a repeating unit derived from 4,4'-dihydroxybiphenyl, 4-amino-4'-hydroxybiphenyl, or 4,4'-diaminobiphenyl), or a repeating unit in which $Ar^3$ is a diphenyl ether-4,4'-diyl group (for example, repeating unit derived from 4,4'-dihydroxydiphenyl ether, a repeating unit derived from 4-hydroxy-4'-aminodiphenyl ether, or a repeating unit derived from 4,4'-diaminodiphenyl ether), and the like. As the preferable repeating unit (3), a repeating unit in which $Ar^3$ is a 1,4-phenylene group, a 1,3-phenylene group, a 2,6-naphthylene group, or a 4,4'-biphenylylene group is more preferable.

The liquid crystalline polyester preferably has a repeating unit in which X and Y are each an oxygen atom as the repeating unit (3) that is, has a repeating unit derived from an aromatic diol, and more preferably has only a repeating unit in which X and Y are each an oxygen atom as the repeating unit (3).

That is the liquid crystalline polyester more preferably has a repeating unit represented by Formula (21) (may be referred to below as "repeating unit (21)") and a repeating unit represented by Formula (31) (may be referred to below as "repeating unit (31)"), and even more preferably has a repeating unit (1) (preferably a repeating unit in which $Ar^1$ is a 1,4-phenylene group or a 2,6-naphthylene group), a repeating unit (21), and a repeating unit (31).

—CO—$Ar^{21}$—CO—    (21)

—O—$Ar^{31}$—O—    (31)

[In Formula (21) and Formula (31), $Ar^{21}$ and $Ar^{31}$ each independently represent a 1,4-phenylene group, a 1,3-phenylene group, a 2,6-naphthylene group, or a 4,4'-biphenylylene group; at least one hydrogen atom in the group represented by $Ar^{21}$ or $Ar^{31}$ may be each independently substituted with a halogen atom, an alkyl, group having 1 to 10 carbon atoms, or an aryl group having 6 to 20 carbon atoms.]

The content rate of the repeating unit (1) is preferably 30 mol % or more when the total of all the repeating units forming the liquid crystalline polyester according to the present invention is 100 mol %, more preferably 40 mol % or more and 80 mol % or less, even more preferably 50 mol % or more and 70 mol % or less, and particularly preferably 55 mol % or more and 70 mol % or less. In a case where the repeating unit (1) is derived from two or more types of compounds, the amount of the total repeating units (1) is in the above range.

As another aspect, the content rate of the repeating unit (1) in the liquid crystalline polyester is preferably 30 mol % or more with respect to 100 mol % of the total of the repeating unit (1), the repeating unit (2), and the repeating unit (3) more preferably 40 mol % or more and 80 mol % or less, even more preferably 50 mol % or more and 70 mol % or less, and particularly preferably 55 mol % or more and 70 mol % or less.

In addition, in a case where the repeating unit (1) in the liquid crystalline polyester is a repeating unit derived from parahydroxybenzoic acid, the content rate of the repeating unit derived from parahydroxybenzoic acid is preferably 40 mol % or more when the total of the repeating units forming the liquid crystalline polyester according to the present invention is 100 mol %, more preferably 45 mol % or more and 80 mol % or less, even more preferably 50 mol % or more and 70 mol % or less, and particularly preferably 55 mol % or more and 65 mol % or less.

As another aspect, the content rate of the repeating unit derived from parahydroxybenzoic acid is preferably 40 mol % or more with respect to 100 mol % total of the repeating unit (1), the repeating unit (2), and the repeating unit (3), more preferably 45 mol % or more and 80 mol % or less, even more preferably 50 mol % or more and 70 mol % or less, and particularly preferably 55 mol % or more and 65 mol % or less.

When the content rate of the repeating unit (1) is 80 mol % or less, the processing temperature does not easily become high, and appearance defects do not easily occur, which is preferable.

The content rate of the repeating unit (2) in the liquid crystalline polyester is preferably 35 mol % or less with respect to 100 mol % of the total of all the repeating units forming the liquid crystalline polyester according to the present invention, more preferably 10 mol % or more and 35 mol % or more, even more preferably 15 mol % or more and 30 mol % or less, and particularly preferably 17.5 mol % or more and 27.5 mol % or less. In a case where the repeating unit (2) is derived from two or more types of compounds, the amount of the total repeating units (2) is in the above range.

The content rate of the repeating unit (2) of the liquid crystalline polyester is preferably 35 mol % or less with respect to 100 mol % of the total of the repeating unit (1), the repeating unit (2), and the repeating unit (3), more preferably 10 mol % or more and 35 mol % or less, even more preferably 15 mol % or more and 30 mol % or less, and particularly preferably 17.5 mol % or more and 27.5 mol % or less.

In a case where the repeating unit (2) of the Nu d crystalline polyester is a repeating unit derived from terephthalic acid, the content rate of the repeating unit derived from terephthalic acid is preferably 35 mol % or less, with respect to 100 mol % of the total of all the repeating units forming the liquid crystalline polyester according to the present invention, more preferably 10 mol % or more and 35 mol % or less, even more preferably 10 mol % or more and 20 mol % or less, and particularly preferably 11 mol % or more and 18 mol % or less.

As another aspect, the amount of the repeating unit derived from terephthalic acid is preferably 35 mol % or less with respect to 100 mol % of the total of the repeating unit (1), the repeating unit (2), and the repeating unit (3), more preferably 10 mol % or more and 35 mol % or less, even more preferably 10 mol % or more and 20 mol % or less, and particularly preferably 11 mol % or more and 18 mol % or less.

When the content rate of the repeating unit (2) is in the above range, it is possible to impart sufficient heat resistance to the molded ovenware and to increase the strength when used in an oven.

The content rate of the repeating unit (3) in the liquid crystalline polyester is preferably 35 mol % or less with respect to 100 mol % of the total of all the repeating units forming the liquid crystalline polyester, more preferably 10 mol % or more and 35 mol % or less, even more preferably 15 mol % or afore and 30 mol % or less, and particularly preferably 17.5 mol % or more and 27.5 mol % or less.

As another aspect, the content rate of the repeating unit (3) in the liquid crystalline polyester is preferably 35 mol % or less with respect to 100 mol % of the total of the repeating unit (1), the repeating unit (2), and the repeating unit (3), more preferably 10 mol % or more and 35 mol % or less, even more preferably 15 mol % or more and 30 mol % or less, and particularly preferably 17.5 mol % or more and 27.5 mol % or less.

The liquid crystalline polyester may have at least two types of repeating units (1) to (3), independently of each other. In addition, the liquid crystalline polyester may have a repeating unit other than the repeating units (1) to (3), but the content rate thereof is preferably 0 mol % or more and 10 mol % or less with respect to a total of 100 mol % of all of the repeating units, and more preferably 0 mol % or more and 5 mol % or less.

The amount of the liquid crystalline polyester resin included in the resin composition is preferably 45% by mass or more and 70% by mass or less with respect to the total mass of the resin composition, more preferably 50% by mass or more and 65% by mass or less, and even more preferably 50% by mass or more and 62% by mass or less.

In addition, resins other than liquid crystalline polyester may be included in the resin composition and examples of resins other than liquid crystalline polyester include thermoplastic resins other than liquid crystalline polyesters such as polypropylene, polyamide, polyesters other than liquid crystalline polyesters, polysulfone, polyphenylene sulfide, polyether ketone, polycarbonate, polyphenylene ether, and polyetherimide, and thermosetting resins such as phenol resin, epoxy resin, polyimide resin, and cyanate resin. The amount of the resin other than the liquid crystalline polyester is usually 0 to 20 parts by mass with respect to 100 parts by mass of the liquid crystalline polyester.

In addition, one type of liquid crystalline polyester resin may be used alone, or at least two types may be used combination.

In a case where two types of liquid crystalline polyester resins are used in combination, these may be appropriately selected according to the ovenware to be molded, for example, in a case where liquid crystalline polyester resin (1) (also referred to as the first liquid crystalline polyester resin) and the liquid crystalline polyester resin (2) (also referred to as the second liquid crystalline polyester resin) for which the blending ratios of the repeating units (1) to (3) are different are represented by [the amount of liquid crystalline polyester (1)]/[the amount of liquid crystalline polyester (2)] (parts by mass/party by mass), 90/10 to 10/90 is preferable, 80/20 to 20/80 is more preferable, and 60/40 to 40/60 as even more preferable.

"The blending ratios of the repeating units (1) to (3) are different" means that the content rate of at least one of the repeating unit (the repeating unit (2), and the repeating unit (3) in the liquid crystalline polyester resin (1) is different to the content rate of the repeating unit (1), the repeating unit (2), and the repeating unit (3) in the liquid crystalline polyester resin (2). For example, in a case where the content rate of the repeating unit (1) in the liquid crystalline polyester resin (1) is different from the content rate of the liquid crystalline polyester (2), the blending ratios of the repeating units (1) to (3) are different in the liquid crystalline polyester resin (1) and the liquid crystalline polyester resin (2). As one aspect of the present invention, the content rate of the repeating unit (2) of the liquid crystalline polyester resin (1) is preferably different from the content rate of the repeating unit (2) of the liquid crystalline polyester resin (2).

"The blending ratios of the repeating units (1) to (3) are different" includes a case where at least one of the repeating unit (1), the repeating unit (2), and the repeating unit (3) in the liquid crystalline polyester resin (1) is different from the repeating unit (1), the repeating unit (2), and the repeating unit (3) in the liquid crystalline polyester resin (2). The content rate of each of the repeating unit (1), the repeating unit (2), and the repeating unit (3) in the liquid crystalline polyester resin (1) in this case may be the same as the content rate of each of the repeating unit (1), the repeating unit (2), and the repeating unit (3) in the liquid crystalline polyester resin (2), and at least one of the repeating unit (1), the repeating unit (2), and the repeating unit (3) in the liquid crystalline polyester resin (1) may be different from the repeating unit (1), the repeating unit (2), and the repeating unit (3) in the liquid crystalline polyester resin (2). As one aspect of the present invention, the repeating unit (2) in the liquid crystalline polyester resin (1) is preferably different from the repeating unit (2) in the liquid crystalline polyester resin (2).

"The Wending ratios of the repeating units (1) to (3) are different" includes a case where the repeating unit (1), the repeating unit (2), and the repeating unit (3) in the liquid crystalline polyester resin (1) are each the same as the repeating unit (1), the repeating unit (2), and the repeating unit (3) in the liquid crystalline polyester resin (2), and the content rate of each of the repeating units (1) to (3) are the same but at least one It the repeating units (1) to (3) of the liquid crystalline polyester resin (1) and the liquid crystalline polyester resin (2) is formed of at least two types of repeating units. At this time, for example, when the repeating unit (1) in the liquid crystalline polyester resin (2) is knitted of at least two types of repeating units, one type among these is the same as the repeating unit (1) in the liquid crystalline polyester resin (1). As one aspect of the present invention, the repeating unit (1), the repeating unit (2), and the repeating unit (3 its the liquid crystalline polyester resin (1) and the repeating unit (1) and the repeating unit (3) in the liquid crystalline polyester resin (2) are each formed from the same type of repeating unit, the repeating unit (2) in the liquid crystalline polyester resin (2) is preferably formed of the same repeating unit as the repeating unit (2) in the liquid crystalline polyester resin (1) and at least one other type of repeating unit.

"The blending ratios of the repeating units (1) to (3) are different" includes a case where the content rate of each of the repeating unit (1), the repeating unit (2), and the repeating unit (3) in the liquid crystalline polyester resin (1) and the content rate oaf the repeating unit (1), the repeating unit (2), and the repeating unit (3) in the liquid crystalline polyester resin (2) are the same, but at least one of the repeating units (1) to (3) in the liquid crystalline polyester resin (1) is formed of at least two types of repeating units and the repeating units in the liquid crystalline polyester resin (2) which correspond to the repeating units formed f least two types of repeating units in the liquid crystalline polyester resin (1), are formed of at least two types of repeating units. At this time, fear example, a case is included in which, when the repeating unit (1) in the crystalline polyester resin (1) is formed of at least two types of repeating units, the repeating unit (1) in the liquid crystalline polyester resin (2) is formed of one type of the repeating units included in the repeating unit (1) n the liquid crystalline polyester resin (1) and at least one other type of repeating unit, and the repeating units (1) to (3) in the liquid crystalline polyester resin (1) other than these are the same as the repeating units (1) to (3) in each of the liquid crystalline polyester resin (2). At this date, each of the content rate of at least two types of repeating units in the liquid crystalline polyester resin (1) and the liquid crystalline polyester resin (2) may be the same for the liquid crystalline polyester resin (1) and the liquid crystalline polyester resin (2) or may be different. As one aspect of the present invention, the repeating unit (1) and the repeating unit (3) in the liquid crystalline polyester resin (1) and the repeating unit (1) and the repeating unit (3) in the liquid crystalline polyester resin (2) are each fasted of one type of repeating unit, and the repeating unit (2) in the liquid crystalline polyester resins (1) and (2) is formed of at least two types of repeating units, and the repeating unit (2) of the liquid crystalline polyester (2) is preferably formed of one type of the repeating units included in the repeating unit (2) of the liquid crystalline polyester (1) and at least one other type of repeating unit.

"The blending ratios of the repeating units (1) to (3) are different" includes a case where the repeating unit (1), the repeating unit (2), and the repeating unit (3) in the liquid crystalline polyester resin 1 are each the same as the repeating unit (1), the repeating unit (2), and the repeating unit (3) in the liquid crystalline polyester resin (2), the content rate of each of the repeating units (1) to (3) are also the same, but at least one in the repeating units (1) to (3) described above in the liquid crystalline polyester resin (1) is fort red of at least two types of repeating units, and, among, the repeating units (1) to (3) in the liquid crystalline polyester resin (2), the repeating units corresponding to the repeating units formed of at least two types of repeating units of the liquid crystalline polyester resin (1) are formed of at least two types of repeating units which are the same as the case of the liquid crystalline polyester resin (1), the content rate of each of the repeating units formed of the at least two types of repeating units are different in the liquid crystalline polyester resin (1) and the liquid crystalline polyester resin (2). As one aspect of the present invention, the repeating unit (1) and the repeating unit (3) in the liquid crystalline polyester resin (1) and the repeating unit (1) and the repeating unit (3) in the liquid crystalline polyester resin (2) are each formed of the same one type, the repeating unit (2) in the liquid crystalline polyester resin (1) and the repeating unit (2) in the liquid crystalline polyester resin (2) are formed of at least two types which are the same, the content rate of each of the repeating units (1) or (3) are also the same, but the content rate of each of the at least two types of repeating units of the repeating unit (2) in the liquid crystalline polyester resin (1) and the content rate of each of the a least two types of repeating units of the repeating unit (2) in the liquid crystalline polyester remit (2) are preferably different.

The liquid crystalline polyester is preferably produced by melt-polymerizing a raw material monomer corresponding to the repeating unit forming the liquid crystalline polyester and solid-phase polymerizing the obtained polymer (pre-polymer). Due to this, it is possible to produce high molecular weight liquid crystalline polyester having high heat resistance, strength, and rigidity with good operablity. The melt polymerization may be performed in the presence of a catalyst. Examples of the catalyst include metal compounds such as magnesium acetate, stannous acetate, tetrabutyl titanate, lead acetate, sodium acetate, potassium acetate, and antimony trioxide, and nitrogen-containing heterocyclic compounds such as N,N-dimethylaminopyridine and N-methylimidazole, and nitrogen-containing heterocyclic compounds are preferable.

The flow initiation temperature of the liquid crystalline polyester is preferably 270° C. or higher, more preferably 270° C. or higher to 400° C. or lower, and even more preferably 280° C. or higher to 380° C. or lower. When the flow initiation temperature of the liquid crystalline polyester is in the above range, the heat resistance, strength and rigidity are good, heat degradation does not easily occur at the time of molding, and the viscosity at the time of melting does not easily increase, such that the fluidity tends to not easily decrease.

The flow initiation temperature is also referred to as a flow temperature or a fluid temperature and is a temperature at which a viscosity of 4800 Pa·s (48000 poise) is exhibited when, while raising the temperature at a rate of 4° C./min under a load of 9.8 MPa (100 kgf/cm$^2$) using a capillary rheometer, the liquid crystalline polyester s melted and extruded from a nozzle having an inner diameter of 1 mm and a length of 10 mm, and is an indication of the molecular weight of the liquid crystalline polyester (refer to "Liquid Crystal Polymer-Synthesis-Molding-Application", edited by Naoyuki Koide, CMC Corporation, Jun. 5, 1987, p. 95).

Inorganic Filler

The inorganic filler may be a fibrous filler, a plate-shaped filler, or a granular filler other that fibrous and plate-shaped fillers. In the present invention, a talc filler is referable as an inorganic filler.

The talc filler is preferably a pulverized hydrous magnesium silicate. The crystalline structure of the hydrous magnesium silicate molecule is a pyrophilite type three-layer structure, and the talc filler is a stack of this structure. As the talc, tabular talc obtained by finely pulverizing crystals of hydrous magnesium silicate molecules to be approximately one unit layer is more preferable.

The average particle size of the talc flier is preferably 5 μm or more and 30 μm or less, and more preferably 10 μm or more and 25 μm or less. When the average particle size is in the above range, it is possible to obtain a good appearance and, when at the upper limit value or more, the mixing of talc having a large particle size increased when the talc is sieved which easily leads to appearance defects in which roughness is easily generated on the surface of the molded product.

Here, it is possible to measure the average particle size of the talc filler, for example, by the following method. 0.1 g of powder of talc filler is added to 50 ml of a 0.2 mass % sodium hexametaphosphate aqueous solution to obtain a dispersion in which the powder is dispersed.

Next, with respect to the obtained dispersion, the particle size distribution is measured using a Master Sizer 2000 (laser diffraction scattering particle size distribution measuring device) manufactured by Malvern instruments, and a cumulative particle size distribution curve based on volume is obtained. In the obtained cumulative particle size distribution curve, the value of the particle size viewed from the side of the fine particles at 50% accumulation is the 50% cumulative volume particle size $D_{50}$, and this value is used as the average particle size of the talc filler.

The talc filler ma be used as it is without treatment, or the surface thereof may be treated with various known surfactants and used in order to improve the interfacial adhesion with the liquid crystalline polyester and the dispersibility with respect to the liquid crystalline polyester. Examples of surfactants include a silane coupling agent, a titan n coupling agent, a higher fatty acid, a higher fatty acid ester, a higher fatty acid amide, higher fatty acid salts, and the like.

In an aspect of the present invention, the amount of the inorganic filler is preferably 50 parts by mass or more and 100 parts by mass or less with respect to 100 parts by mass of the liquid crystalline polyester resin, and more preferably 60 parts by mass or more and 90 parts by mass or less, and even more preferably 60 parts by mass or moray and 80 parts by mass or less. When the amount of the inorganic filler exceeds 100 parts by mass, the specific gravity of the resin composition becomes high and the strength of the obtained ovenware tends to decrease.

Fatty Acid Compound

In the present Invention, the resin composition includes a fatty acid compound. The fatty acid compound is a component which improves the ease of metering at the time of molding and acts as a releasing agent, and is a component for stably producing an ovenware. However, fatty acid compounds are oxidatively decomposed by heating to generate nonanal and decanal which are components with an unpleasant odor. Therefore, in the present invention, the amount of the fatty acid compound is preferably small. More specifically, the amount of the fatty acid compound in the resin composition of the present invention is preferably 0.001 parts by mass or more and 0.5 parts by mass or less with respect to 100 parts by mass of the liquid crystalline polyester resin, more preferably 0.001 parts by mass or more and 0.25 parts by mass or less, and even more preferably 0.001 parts by mi s r more and 0 parts by mass or less.

When the amount of the fatty acid compound is the above range, it s possible for the total generated concentration of nominal and decanal to be 1 vol ppb or less while realizing stable productivity. The total generated concentration of nonanal and decanal means the total amount of nonanal and decanal with respect to the entirety of the sample gas collected from the ovenware sample according to the above measuring method.

As the fatty acid compound, it is possible to use at least ogre selected from the group consisting of fatty acids, fatty acid metal salts, fatty acid esters, and fatty acid amides. Among these, the present invention preferably contains a fatty acid metal salt.

As the fatty acid, an aliphatic monocarboxylic acid having or tore carbon atoms is preferable.

The number of carbon atoms of the fatty acid is preferably 8 to 40. The fatty acid is not limited to the following, but examples thereof include saturated or unsaturated linear or branched aliphatic monocarboxylic acids. Examples of the fatty acid include stearic acid (number of carbon atoms 18), palmitic acid (number of carbon atoms 16), behenic acid (number of carbon atoms 22), erucic acid (number of carbon atoms 22), oleic acid (number of carbon atoms 18), lauric acid (number of carbon atoms 12), montanic acid (number of carbon atoms 25), and the like.

Among the above, in view of heat resistance and transpiration of the liquid crystalline polyester resin composition at the processing temperature, it is desirable that the molecular weight of the fatty acrid-derived compound is creased by saponification, condensation or the like without being used as a single substance. In addition, a fatty acid-derived compound having 12 to 24 carbon atoms is more preferable, and stearic acid or behenic acid is more preferable.

The fatty acid metal salt is a meal salt of the fatty acid described above.

The metal element forming a salt with the fatty acid is preferably at least one type selected from the group consisting of lithium, magnesium, calcium, zinc, sodium, barium, aluminum, and potassium.

The fatty acid metal salt is not limited to the following, but examples thereof include metal stearate, metal montanate, metal behenate, metal laurate, and metal palmitate. Specific examples include calcium stearate, aluminum stearate, zinc stearate, magnesium stearate, calcium montanate, sodium montanate, aluminum montanate, zinc montanate, magnesium montanate, calcium behenate sodium behenate, zinc behenate, calcium laurate, zinc laurate, calcium palmitate and the like.

As the fatty as acid metal salt metal montanate, metal behenate and metal stearate are preferably used and, among these, calcium stearate, alumina m stearate, zinc stearate, magnesium stearate, calcium montanate, zinc montanate, magnesium montanate, calcium behenate, and zinc behenate are preferable, and calcium stearate, aluminum stearate, zinc stearate, magnesium stearate, calcium montanate, zinc montanate, calcium behenate, and zinc behenate are more preferable, and calcium stearate, calcium montanate, and calcium behenate are even more preferable.

One type of these fatty acid metal salts may be used alone, or at least two thereof may be used in combination.

The fatty acid amide is an amidated product of the fatty acid described above.

The fatty acid amide is not limited to the following, but examples thereof include stearic acid amide, oleic as amide, erucic acid amide ethylene bis stearamide, ethylene bis oleyl amide, N-stearyl stearamide, N-stearyl erucamide, and the like. As the higher fatty acid amide, stearic acid amide, erucic acid amide ethylene bis stearamide, and N-stearyl erucamide are preferable, and ethylene bis stearamide N-stearyl erucamide are more preferable.

For the amide-based and nitrogen-containing compounds, a nitrogen-derived unpleasant odor also occurs, such that a compound having a low nitrogen content is preferable.

The fatty acid ester is an esterified product of the fatty acid described above and alcohol.

The fatty acid ester is preferably esterified product of at aliphatic monocarboxylic acid having 8 to 40 carbon atoms and an aliphatic alcohol having 8 to 40 carbon atoms.

The aliphatic alcohol is not limited to the following, but examples thereof include stearyl alcohol behenyl alcohol, lauryl alcohol, glycerol tristearate, and the like, and examples of the fatty acid ester include stearyl stearate, behenyl behenate, and the like.

As a method for blending the fatty acid compound in the resin composition, the fatty acid compound may be blended in a mixture of a liquid crystalline polyester resin, an inorganic filler and the like before mixing and kneading then mixed and kneaded together, or the fatty acid compound may be mixed with a pelletized rosin composition obtained by mixing and kneading a mixture of a polyester resin, an inorganic filler, and the like. From the viewpoint of improving the ease of metering, it is preferable to carry out the mixing and blending in a pelletized resin composition.

Other Components

In addition, the resin composition used in the present invention may include at least one component other than the liquid crystalline polyester, the inorganic filler, and the fatty acid compound in a range in which the function of the resin composition used in the present invention is not impaired.

(Pigments)

In the present invention, the resin composition preferably contains a pigment. The pigment contained in the resin composition may be appropriately selected according to the design of the ovenware and examples of the pigment include inorganic fillers such as alumina, iron oxide, titanium oxide, cobalt oxide, chromium oxide, manganese oxide, and carbon black. In particular, the preset invention preferably contains carbon black. The inorganic filler is not included in the pigment of the present invention. Here, one type of the pigment may be used alone, or two of mote types thereof may be used at the same time.

In an aspect of the present invention, the blending amount of the carbon black, is preferably 1 part by mass or more and 10 parts by mass or less with respect to 100 parts by mass of the liquid crystalline polyester resin, and more preferably 1 part by mass or more and 5 parts by mass or less.

(Releasing Agent)

In addition, in the present invention, the resin composition may include a releasing agent different from the fatty acid compound. Examples of the releasing agent include polytetrafluoroethylene, silicone oil, and wax. In a case where the resin composition of the present invention includes a releasing agent, the amount thereof is preferably 0.01 parts b mass to 5 parts by mass or less with respect to 100 parts by mass of the liquid crystalline polyester resin, more preferably 0.01 parts by mass to 3 parts by mass or less, and even more preferably greater than 0.01 parts by mass and 2 parts by mass or less.

Resin Composition for Molding an Ovenware

A second aspect of the present invention is a resin composition for molding an ovenware.

The description of the resin composition for molding an ovenware of the present invention is the same as described as the resin composition to be used for molding an ovenware of the first aspect of the present invention.

The method for producing the resin composition for molding an ovenware of the present invention includes blending, mixing, and kneading the liquid crystalline polyester resin used for molding an ovenware of the first aspect of the present invention, an inorganic filler, and a pigment as desired at a predetermined blending ratio.

Another aspect of the ovenware of the present invention is an ovenware including a molded article of a resin composition containing a liquid crystalline polyester resin, an inorganic filler, and a fatty acid compound, in which, in a case where the ovenware is heated at 250° C., the total generated concentration of nonanal and decanal derived from a fatty acid compound is 1 vol ppb or less, and the fatty acid compound is at least one of a metal behenate and a metal stearate.

The amount of the fatty acid compound is 0.001 parts by mass or more and 0.2 parts by mass or less with respect to 100 parts by mass of the liquid crystalline polyester resin.

The liquid crystalline polyester resin includes at least the repeating unit (1), the repeating unit (2), and the repeating unit (3), and the repeating unit (1) is a repeating unit in which $Ar^1$ is a 1,4-phenylene group (for example, a repeating unit derived from 4-hydroxybenzoic acid), the repeating unit (2) is at least one of a repeating unit in which $Ar^2$ is a 1,4-phenylene group (for example, a repeating unit derived from terephthalic acid) and a repeating unit in which $Ar^2$ is a 1,3-phenylene group (for example, a repeating unit derived from isophthalic acid), and the repeating unit (3) is a repeating unit in which $Ar^3$ is 4,4'-biphenylylene group (for example, a repeating unit derived from 4,4'-dihydroxybiphenyl, 4-amino-4'-hydroxybiphenyl, or 4,4'-diaminobiphenyl).

The liquid crystalline polyester resin has at least the repeating unit (1), the repeating unit (2), and the repeating unit (3), and the repeating unit (1) is at least one of a repeating unit in which $Ar^1$ is a 1,4-phenylene group (for example, a repeating unit derived from 4-hydroxybenzoic acid) and a repeating unit in which $Ar^1$ is a 2,6-naphthylene group (for example, a repeating unit derived from 6-hydroxy-2-naphthoic acid), the repeating unit (2) is a repeating unit in which $Ar^2$ is a 1,4-phenylene group (for example, a repeating unit derived from terephthalic acid), and the repeating unit (3) is a repeating unit in which $Ar^3$ is a 4,4'-biphenylylene group (for example, a repeating unit derived from 4,4'-dihydroxybiphenyl, 4-amino-4'-hydroxybiphenyl, or 4,4'-diaminobiphenyl) and a repeating unit in which $Ar^3$ is a 1,3-phenylene group (for example, at least one repeating unit derived from 1,3-benzenediol, m-aminophenol (for example, 4-acetoxyaminophenol) or m-phenylenediamine).

In the liquid crystalline polyester resin, the content rate of the repeating unit (1) is 55 mol % or more and 65 mol % or less when the total of the repeating unit (1), the repeating unit (2), and the repeating unit (3) is 100 mol %, the content rate of the repeating unit (2) is 17.5 mol % or more and 27.5 mol % or less when the total of the repeating unit (1), the repeating unit (2), and the repeating unit (3) is 100 mol %, and the content rate of the repeating unit (3) is 17.5 mol % or more and 27.5 mol % or less when the total of the repeating unit (1), the repeating unit (2), and the repeating unit (3) is 100 mol %.

In a case where the ovenware is heated at 250° C., the total generated concentration of nominal and decanal derived from the fatty acid compound is preferably 0.8 vol ppb or less.

In a case where the ovenware is heated at 250° C., the total generated concentration of and do canal derived from the fatty add compound is more preferably 0.5 vol ppb or less.

Another aspect of the liquid crystalline polyester resin composition for molding an ovenware of the present invention is a resin composition containing a liquid crystalline polyester resin, an inorganic filler, and a fatty acid compound, in which, in a case of being heated at 250° C., the total generated concentration of nonanal and decanal is 1 vol ppb or less, the fatty acid compound is at least one of a metal behenate and a metal stearate.

The amount of the fatty acid compound is 0.001 parts b mass or more and 0.2 parts by mass or less with respect to 100 parts by mass of the liquid crystalline polyester resin.

The liquid crystalline polyester resin has at least the repeating unit (1), the repeating unit (2), and the repeating unit (3), and the repeating unit (1) is a repeating unit in which $Ar^1$ is a 1,4-phenylene group (for example, a repeating unit derived from 4-hydroxybenzoic acid), the repeating unit (2) is at least one of a repeating unit in which $Ar^2$ is a 1,4-phenylene group (for example, a repeating unit derived from terephthalic acid) and a repeating unit which is a 1,3-phenylene group (for example, a repeating derived from isophthalic acid), and the repeating unit (3) is a repeating unit in which $A^2$ is 4,4'-biphenylylene group (for example, a repeating unit derived from 4,4'-dihydroxybiphenyl, 4-amino-4'-hydroxybiphenyl, or 4,4'-diaminobiphenyl).

The liquid crystalline polyester resin has at least the repeating unit (1), the repeating unit (2), and the repeating unit (3), the repeating unit (1) is at least one of a repeating unit in which $Ar^1$ is a 1,4-phenylene group (for example, a repeating unit derived from 4-hydroxybenzoic acid) and a repeating unit in which $Ar^1$ is a 2,6-naphthylene group (for example, a repeating unit derived from 6-hydroxy-2-naphthoic acid), the repeating unit (2) is a repeating unit in which $Ar^2$ is a 1,4-phenylene group (for example, a repeating unit derived from terephthalic acid), and the repeating unit (3) is a repeating unit in which $Ar^2$ is a 4,4'-biphenylylene group (for example a repeating unit derived from 4,4'-dihydroxybiphenyl, 4-amino-4'-hydroxybiphenyl or 4,4'-diaminobiphenyl) and a repeating unit in which $Ar^2$ is a 1,3-phenylene group (for example, at least one repeating unit derived from 1,3-benzenediol, m-aminophenol (for example, 4-acetoxyaminophenol) or m-phenylenediamine).

In the liquid crystalline polyester resin, the content rate of the repeating unit (1) is 55 mol % or more and 65 mol % or less when the total of the repeating unit (1), the repeating unit (2), and the repeating unit (3) is 100 mol %, the content rate of the repeating unit (2) is 17.5 mol % or more and 27.5 mol % or less when the total of the repeating unit (1), the repeating unit (2), and the repeating unit (3) is 100 mol %, and the content rate of the repeating unit (3) is 17.5 mol % or more and 27.5 mol % or less when the total of the repeating unit (1), the repeating unit (2), and the repeating unit (3) is 100 mol %.

In a case where the ovenware is heated at 250° C., the total generated concentration of nonanal and decanal derived from the fatty acid compound is preferably 0.8 vol ppb or less.

In a case where the ovenware is heated at 250° C., the total generated concentration of nonanal and decanal derived from the fatty acid compound is more preferably 0.5 vol ppb or less.

EXAMPLES

A more specific description will be given below of the present invention with reference to Examples, but the present invention is not limited to the following Examples.

Production of Liquid Crystalline Polyester Resin

Liquid Crystalline Polyester Resin I

Into a reactor provided with a stirrer, a torque meter, a nitrogen gas inlet tube, a thermometer, and a reflux condenser, 994.5 g (7.2 mol) of parahydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, and 1347.6 g (13.2 mol) of acetic anhydride were charge 0.2 g of 1-methylimidazole was added thereto, and the interior of the reactor was thoroughly substituted with nitrogen gas. Thereafter, the temperature was raised from room temperature to 150° C. over 30 minutes under a nitrogen gas flow, and the temperature was maintained, and reflux carried out for one hour.

Subsequently, while by-product acetic acid and unreacted acetic anyhydride were distilled off, the temperature was raised front 150° C. to 320° C. over 2 hours and 50 minutes, and the reaction was finished at the time when an crease in torque was observed to obtain a prepolymer.

The obtained prepolymer was cooled to room temperature and pulverized by a coarse pulverizer. The obtained prepolymer powder was heated from room temperature to 250° C. over one hour in a nitrogen atmosphere, heated from 250° C. to 285° C. over 5 hours, and held at 285° C. for 3 hours to perform solid phase polymerization and obtain a liquid crystalline polyester resin I. The flow initiation temperature of the obtained liquid crystalline polyester resin I was 32.7° C.

Liquid Crystalline Polyester Resin II

Into a reactor provided with a stirrer, a torque meter, a nitrogen gas inlet tube, a thermometer, and a reflux condenser 994.5 g (7.2 mol) of parahydroxybenzoic acid, 446.9 g (2.4 mol) of 4,4'-dihydroxybiphenyl, 358.8 g (2.2 mol) of terephthalic acid, 39.9 g (0.2 mol) of isophthalic acid, and 1347.6 g mol) of acetic anhydride were charged, 0.2 g of 1-methylimidazole was added thereto, and the interior of the reactor was thoroughly substituted with nitrogen gas.

Thereafter, the temperature g as raised from room temperature to 150° C. over 30 minutes under a nitrogen gas flow, and the temperature vas maintained and reflux carried out for one hour.

Subsequently, while by-product acetic acid and unreacted acetic anhydride were distilled off, the temperature was raised from 150° C. to 320° C. over 2 hours and 50 minutes, and the reaction was finished at the time when an increase in torque was observed to obtain a prepolymer.

The obtained prepolymer was cooled to room temperature and pulverized by a coarse pulverizer. The obtained prepolymer powder was heated from room temperature to 250° C. over one hour in a nitrogen atmosphere, heated from 250° C. to 305° C. over 5 hours, and held at 305° C. for 3 hours to perform solid phase polymerization and obtain a liquid crystalline polyester resin II. The flow initiation temperature of the obtained liquid crystalline polyester resin II was 357° C.

Liquid Crystalline Polyester Resin IV

Into a reactor provided with a stirrer, a torque meter, a nitrogen gas inlet tube, a thermometer, and a reflux condenser, 1130.4 g (8.2 mol) of parahydroxybenzoic acid, 128.4 g (0.7 mol) of 6-hydroxy-2-naphthoic acid, 52.2 g (1.7 mol) of 4,4'-dihydroxybiphenyl, 400.8 g (2.4 mol) of terephthalic acid, 103.2 g (0.7 mol) of 4-acetoxyaminophenol, and 1357.2 g (13.3 mol) of acetic anhydride were charged, 0.2 g of 1-methylimidazole was added thereto, and the interior of the reactor was thoroughly substituted with nitrogen gas. Thereafter, the temperature was raised from room temperature to 150° C. over 30 minutes under a nitrogen gas flow, and the temperature was maintained and reflux carried out for one hour.

Subsequently, while distilling off by-product acetic acid and unreacted acetic anhydride, the temperature was raised from 150° C. to 340° C. over 4 hours and 30 minutes, then the pressure was reduced to 10 Torr to distill off by-product acetic acid and unreacted acetic anhydride and obtain a liquid crystalline polyester resin IV. The flow initiation temperature of the obtained liquid crystalline polyester resin IV was 320° C.

Each of the liquid crystalline polyester resins obtained above an inorganic filler, carbon black (CB), and PTFE resin were blended at the blending ratio shown in Table 1 and then mixed and kneaded using a twin-screw extruder (PCM-30 manufactured by Ikegai Tekko Co., Ltd.) to obtain a pelletized resin composition. A fatty acid compound was mixed at the blending ratio shown in Table 1 with respect to 100 parts by mass of the obtained pelletized resin composition to obtain a liquid crystalline polyester resin composition.

TABLE 1

|  | LCP | | Inorganic Filler | | CB | PTFE | | Fatty Acid Compound | |
|---|---|---|---|---|---|---|---|---|---|
|  | Type | Parts by mass | Type | Parts by mass | Parts by mass | Type | Parts by mass | Type | Parts by mass |
| Example 1 | I | 100 | a | 61 | 2 | X | 1 | A | 0.04 |
| Example 2 | I | 100 | a | 61 | 2 | X | 1 | A | 0.1 |
| Example 3 | I | 100 | a | 61 | 2 | X | 1 | A | 0.04 |
| Example 4 | IV | 100 | b | 67 | 2 | Y | 1 | B | 0.05 |
| Example 5 | I | 100 | c | 67 | 2 | Y | 1 | A | 0.04 |
| Comparative Example 1 | I | 100 | a | 54 | 2 | X | 1 | C | 0.015 |
| Comparative Example 2 | I | 100 | a | 54 | 2 | X | 1 | D | 0.05 |
| Comparative Example 3 | I | 100 | a | 54 | 2 | X | 1 | A | 1 |
| Reference Example 1 | I | 100 | a | 54 | 2 | X | 1 | . | 0 |

In Table 1, each symbol represents the following materials.

LCP I, II, IV: liquid crystalline polyester resin I, II, Iv.
a: X-50 (manufactured by Nippon Talc Co., Ltd.: average particle size: 20 μm)
b: RL 1 (manufactured b Fuji Talc Industrial Co., Ltd.: average particle size 10 μm)
c: MS-KY (manufactured by Nippon Talc Co., Ltd.; average pat title size: 23 μm)
CB: carbon black, (abbreviated as CB): Black pearls 4350 (manufactured by Cabot Corporation)
PTFE: Polytetrafluoroethylene
X: Cefral Lube I (manufactured by Central Glass Co., Ltd.)
Y: XPP 511 (manufactured by Solvay Inc.)
A: calcium behenate
B: calcium stearate
C: erucamide
D: Polyamide 6 (Best Jinto 2050; manufactured by Daicel-Evonik Ltd.)

The liquid crystalline polyester resin compositions of Examples 1 to 5, Comparative Examples 1 to 3, and Reference Example 1 were molded by a method which the ease of metering at 330 to 380° C. is confirmed using an injection molding machine to obtain a 3.6-liter capacity ovenware. The obtained ovenware was subjected to the following evaluation.

Odor Evaluation

The opening portion of each ovenware was covered with a lid of aluminum foil and heated at 250° C. for one hour. After that, the aluminum foiled ovenware was taken out at room temperature, the lid of the aluminum foil was taken off and then the odor in the opening portion of the ovenware was smelled, after being left for approximately 30 minutes.

The above test was performed by 7 persons, and tests in which a majority of people were concerned the odor were evaluated as "x" and tests in which a majority of people were not concerned the odor were evaluated as "o".

GC-MS Measurement

Using a section obtained by cutting, a portion of an ovenware with a thickness of 1 to 2 mm into an approximately 5 cm square as a test piece, a glass chamber containing a 70 g test piece is placed in a heating oven, and, while blowing high-purity nitrogen gas into the glass chamber, the temperature inside the heating oven was raised from room temperature to 250° C. in approximately 15 minutes, and heating was carried out at that temperature for approximately 45 minutes (total of 60 minutes from the start of heating) front the time the temperature reached 250° C. 10 liters of high-purity nitrogen gas were blown into the glass chamber for 60 minutes front the start to the end of the heating, and all the gas was collected together with the gas components generated from the test piece to be used for analysis.

Using cold trap dehydration gas chromatograph mass spectrometry (CTD-GC-MS method), the sample gas collected in this manner was measured for the concentration of nonanal and decanal present in the collected 10 liters of high-purity nitrogen gas. The concentrations of nonanal and decanal are in terms of toluene, and are calculated from the ratio of the peak area of toluene and the peak area of each component, assuming that the relationship between the signal intensity and the concentration of the detected components are all equal to toluene. The measurement results are shown in Table 2. In Table 2, nonanal is noun and decanal is deca, respectively. "ND" in Table 2 indicates that the result is below the detection limit (<0.05 vol ppb).

Used Equipment

CID apparatus: ENT-7100A type manufactured by ENTECH
GC/MS apparatus: manufactured by Agilent GC 6890 N+MSD 5975 B type GC-MS Measurement Condition Column: DB-FFAP 60 m length×0.25 mm i.d. 0.50 μm thickness
Flow rate: 2.4 mL/min constant flow mode
Column temperature: 35° C. (3 min) to 7° C./min to 40° C. (0 min) to 15° C./min to 240° C. (3 min)
Ionization mode: EI
Mass range: m/z 29 to 600
MS Quad temp.: 150° C.
MS Source temp.: 230° C.

Ease of Metering

When the molding was performed in an injection molding t Lachine SE 180 EX (manufactured by Sumitomo Heavy Industries, Ltd.) at a hack pressure of 2 MPa, a weighing value of 60 mm, a screw rotation speed of 100 rpm, a filling time of 1 sec, a cooling time of 20 sec, and a minimum cushion value of 5 to 10 mm, the weighing time was measured 10 times. Regarding the longest weighing time (t max) with respect to the average measurement time (t1) in the ten times, a result where t max>1.5×t1 was poor in the ease of metering and a result where t max≤1.5×t1 was good in the ease of metering, and these are denoted by "x" and "o" respectively.

TABLE 2

| | Odor | Nona | Deca Vol ppb | Total Amount | Ease of Metering |
|---|---|---|---|---|---|
| Example 1 | o | 0.3 | 0.2 | 0.5 | o |
| Example 2 | o | 0.4 | 0.4 | 0.8 | o |
| Example 3 | o | ND | ND | ND | o |
| Example 4 | o | 0.2 | 0.3 | 0.5 | o |
| Example 5 | o | 0.3 | 0.2 | 0.5 | o |
| Comparative Example 1 | x | 0.6 | 0.5 | 1.1 | o |
| Comparative Example 2 | x | 0.4 | 0.7 | 1.1 | o |
| Comparative Example 3 | x | >1 | >1 | >2 | o |
| Reference Example 1 | o | ND | ND | ND | x |

According to the results shown in Table 2, the ovenware of Examples 1 to 5 to which the present invention was applied had a total generated concentration of nova al and decanal of 1 vol ppb or less, specifically, 0.8 vol ppb or less, and in Example 3, the value was smaller than 0.05 vol ppb which is the detection limit, and the odor evaluation was "o". In addition to this, the evaluation of the ease of metering was also "o". In contrast, the oven are of Comparative Examples 1 to 3 to which the present invention was not applied, the total generated concentration of nonanal and decanal exceeded 1 vol ppb, and the odor evaluation was "x".

In Reference Example 1, since the molding was carried out using a resin composition not including a fatty acid compound, the odor evaluation, was "o", but the evaluation the ease of metering was "x".

INDUSTRIAL APPLICABILITY

According to the present invention, it is possible to provide an ovenware which generates few odorous components and a liquid crystalline polyester resin composition which is able to be suitably used for the ovenware.

The invention claimed is:

1. An ovenware which is a molded article of a resin composition containing a liquid crystalline polyester resin, an inorganic filler, and a fatty acid compound which is at least one of a fatty acid, a fatty acid metal salt, and a fatty acid ester,
   wherein, when the ovenware is heated at 250° C., a total generated concentration of nonanal and decanal derived from the fatty acid compound is 1 vol ppb or less.

2. The ovenware according to claim 1,
   wherein an amount of the fatty acid compound is 0.001 parts by mass or more and 0.5 parts by mass or less with respect to 100 parts by mass of the liquid crystalline polyester resin.

3. The ovenware according to claim 1,
   wherein the fatty acid compound has 12 to 24 carbon atoms.

4. The ovenware according to claim 1,
   wherein the fatty acid compound is a fatty acid metal salt.

5. The ovenware according to claim 4,
   wherein a metal of the fatty acid metal salt is at least one type selected from the group consisting of aluminum, barium, lithium, magnesium, calcium, zinc, sodium, and potassium.

6. The ovenware according to claim 1,
   wherein an amount of the inorganic filler is 50 parts by mass or more and 100 parts by mass or less with respect to 100 parts by mass of the liquid crystalline polyester resin.

7. The ovenware according to claim 1,
   wherein the liquid crystalline polyester resin has a repeating unit represented by Formula (1):

$$—O—Ar^1—CO— \quad (1)$$

wherein in Formula (1), $Ar^1$ represents a phenylene group, a naphthylene group, or a biphenylylene group; at least one hydrogen atom in the group represented by $Ar^1$ may be substituted with a halogen atom, an alkyl group having 1 to 10 carbon atoms, or an aryl group having 6 to 20 carbon atoms.

8. The ovenware according to claim 1,
   wherein the liquid crystalline polyester resin has a repeating unit represented by Formula (2):

$$—CO—Ar^2—CO— \quad (2)$$

wherein in Formula (2), $Ar^2$ represents a phenylene group, a naphthylene group, a biphenylylene group, or a group represented by Formula (4); at least one hydrogen atom included in $Ar^2$ may be substituted with a halogen atom, an alkyl group having 1 to 10 carbon atoms, or an aryl group having 6 to 20 carbon atoms;

$$—Ar^4—Z—Ar^5— \quad (4)$$

wherein in Formula (4), $Ar^4$ and $Ar^5$ each independently represent a phenylene group or a naphthylene group; and
   Z represents an oxygen atom, a sulfur atom, a carbonyl group, a sulfonyl group, or an alkylidene group having 1 to 10 carbon atoms.

9. The ovenware according to claim 1,
   wherein the liquid crystalline polyester resin has a repeating unit represented by Formula (3):

$$—X—Ar^3—Y— \quad (3)$$

wherein in Formula (3), $Ar^3$ represents a phenylene group, a naphthylene group, a biphenylylene group, or a group represented by Formula (4);
   X and Y each independently represent an oxygen atom or an imino group (—NH—); and
   at least one hydrogen atom included in $Ar^3$ may be substituted with a halogen atom, an alkyl group having 1 to 10 carbon atoms, or an aryl group having 6 to 20 carbon atoms;

$$—Ar^4—Z—Ar^5— \quad (4)$$

wherein in Formula (4), $Ar^4$ and $Ar^5$ each independently represent a phenylene group or a naphthylene group; and
   Z represents an oxygen atom, a sulfur atom, a carbonyl group, a sulfonyl group, or an alkylidene group having 1 to 10 carbon atoms.

10. A liquid crystalline polyester resin composition for molding an ovenware which is a resin composition containing a liquid crystalline polyester resin, an inorganic filler, and a fatty acid compound which is at least one of a fatty acid, a fatty acid metal salt, and a fatty acid ester, wherein, when the ovenware is heated at 250° C., a total generated concentration of nonanal and hexanal is 1 vol ppb or less.

11. The liquid crystalline polyester resin composition according to claim 10,
wherein the fatty acid compound has 12 to 24 carbon atoms.

12. The liquid crystalline polyester resin composition according to claim 10,
wherein the fatty acid compound is a fatty acid metal salt.

13. The liquid crystalline polyester resin composition according to claim 12,
wherein a metal of the fatty acid metal salt is at least one type selected from the group consisting of aluminum, barium, lithium, magnesium, calcium, zinc, sodium, and potassium.

14. The liquid crystalline polyester resin composition according to claim 10,
wherein an amount of the inorganic filler is 50 parts by mass or more and 100 parts by mass or less with respect to 100 parts by mass of the liquid crystalline polyester resin.

15. The liquid crystalline polyester resin composition according to claim 10,
wherein the liquid crystalline polyester resin has a repeating unit represented by Formula (1):

$$-O-Ar^1-CO- \tag{1}$$

wherein in Formula (1), $Ar^1$ represents a phenylene group, a naphthylene group, or a biphenylylene group; at least one hydrogen atom in the group represented by $Ar^1$ may be substituted with a halogen atom, an alkyl group having 1 to 10 carbon atoms, or an aryl group having 6 to 20 carbon atoms.

16. The liquid crystalline polyester resin composition according to claim 10,
wherein the liquid crystalline polyester resin has a repeating unit represented by Formula (2):

$$-CO-Ar^2-CO- \tag{2}$$

wherein in Formula (2), $Ar^2$ represents a phenylene group, a naphthylene group, a biphenylylene group, or a group represented by Formula (4); at least one hydrogen atom included in $Ar^2$ may be substituted with a halogen atom, an alkyl group having 1 to 10 carbon atoms, or an aryl group having 6 to 20 carbon atoms;

$$-Ar^4-Z-Ar^5- \tag{4}$$

wherein in Formula (4), $Ar^4$ and $Ar^5$ each independently represent a phenylene group or a naphthylene group; and
Z represents an oxygen atom, a sulfur atom, a carbonyl group, a sulfonyl group, or an alkylidene group having 1 to 10 carbon atoms.

17. The liquid crystalline polyester resin composition according to claim 10,
wherein the liquid crystalline polyester resin has a repeating unit represented by Formula (3):

$$-X-Ar^3-Y- \tag{3}$$

wherein in Formula (3), $Ar^3$ represents a phenylene group, a naphthylene group, a biphenylylene group, or a group represented by Formula (4);
X and Y each independently represent an oxygen atom or an imino group (—NH—); and
at least one hydrogen atom included in $Ar^3$ may be substituted with a halogen atom, an alkyl group having 1 to 10 carbon atoms, or an aryl group having 6 to 20 carbon atoms;

$$-Ar^4-Z-Ar^5- \tag{4}$$

wherein in Formula (4), $Ar^4$ and $Ar^5$ each independently represent a phenylene group or a naphthylene group; and
Z represents an oxygen atom, a sulfur atom, a carbonyl group, a sulfonyl group, or an alkylidene group having 1 to 10 carbon atoms.

* * * * *